United States Patent
Meeker

(10) Patent No.: US 7,593,016 B2
(45) Date of Patent: Sep. 22, 2009

(54) METHOD AND APPARATUS FOR HIGH DENSITY STORAGE AND HANDLING OF BIT-PLANE DATA

(75) Inventor: Woodrow L. Meeker, Orlando, FL (US)

(73) Assignee: Teranex Systems, Inc, Orlando, FL (US)

( * ) Notice: Subject to any disclaimer, the term of this patent is extended or adjusted under 35 U.S.C. 154(b) by 623 days.

(21) Appl. No.: 11/101,771

(22) Filed: Apr. 8, 2005

(65) Prior Publication Data
US 2005/0248578 A1 Nov. 10, 2005

Related U.S. Application Data

(60) Provisional application No. 60/560,473, filed on Apr. 8, 2004.

(51) Int. Cl.
G06T 1/60 (2006.01)
G06F 12/06 (2006.01)
G06F 13/00 (2006.01)

(52) U.S. Cl. ............... 345/530; 345/571; 345/537; 345/538

(58) Field of Classification Search ........... 345/505, 345/562, 558, 559, 530, 537, 538, 571
See application file for complete search history.

(56) References Cited

U.S. PATENT DOCUMENTS

| | | | | |
|---|---|---|---|---|
| 5,519,829 A | * | 5/1996 | Wilson | 345/530 |
| 5,923,338 A | * | 7/1999 | Rich | 345/505 |
| 6,067,609 A | * | 5/2000 | Meeker et al. | 712/11 |
| 6,173,388 B1 | * | 1/2001 | Abercrombie et al. | 712/22 |
| 6,185,667 B1 | * | 2/2001 | Abercrombie et al. | 712/11 |
| 6,728,862 B1 | * | 4/2004 | Wilson | 712/14 |
| 6,728,863 B1 | * | 4/2004 | Jackson et al. | 712/14 |

* cited by examiner

Primary Examiner—M Good Johnson
(74) Attorney, Agent, or Firm—Allen, Dyer, Doppelt, Milbrath & Gilchrist, P.A.

(57) ABSTRACT

In an image processing system, high density storage of bit-plane data is provided in a secondary or page memory as well as high bandwidth access to the data by an image processor. The page memory provides storage of data not currently being processed. The page memory may also be part of a system that provides input and output of image data to and from the image processor. The image data may be handled outside the image processor in a packed pixel form and be converted between that form and bit-line form which the page memory stores during input and output. The bit-line data may be gathered into bit-planes for use by the image processor during movement of data from the page memory to the processing logic.

14 Claims, 14 Drawing Sheets

Frame Buffer 600 — Subframe in/out — page memory 40 — Page in/out — PE Memory 110

Page Memory Criteria

| Item | page memory 40 Criteria |
|---|---|
| 1 | page memory 40 storage density (bits per unit of die space) |
| 2 | Subframe i/o bandwidth |
| 3 | Subframe i/o foreground cost |
| 4 | Paging bandwidth |
| 5 | Paging foreground cost |
| 6 | Cross-cost between Subframe i/o and paging |

Table 1 – Comparison of page memory 40 Approaches

| Item | Criteria | Performance of each Approach | | |
|---|---|---|---|---|
| | | Bit Line | Bit Plane | 1/8th Plane |
| 1 | page memory 40 density | Very High | Very Low | High |
| 2 | Subframe i/o bandwidth | High | High | High |
| 3 | Subframe i/o foreground cost | Very Low | Very Low | Very Low |
| 4 | Paging bandwidth | Very Low | Very High | Med |
| 5 | Paging foreground cost | Med | Very Low | Low |
| 6 | Subframe i/o and Paging Cross-cost | Very High | Med | Low |

FIG. 14

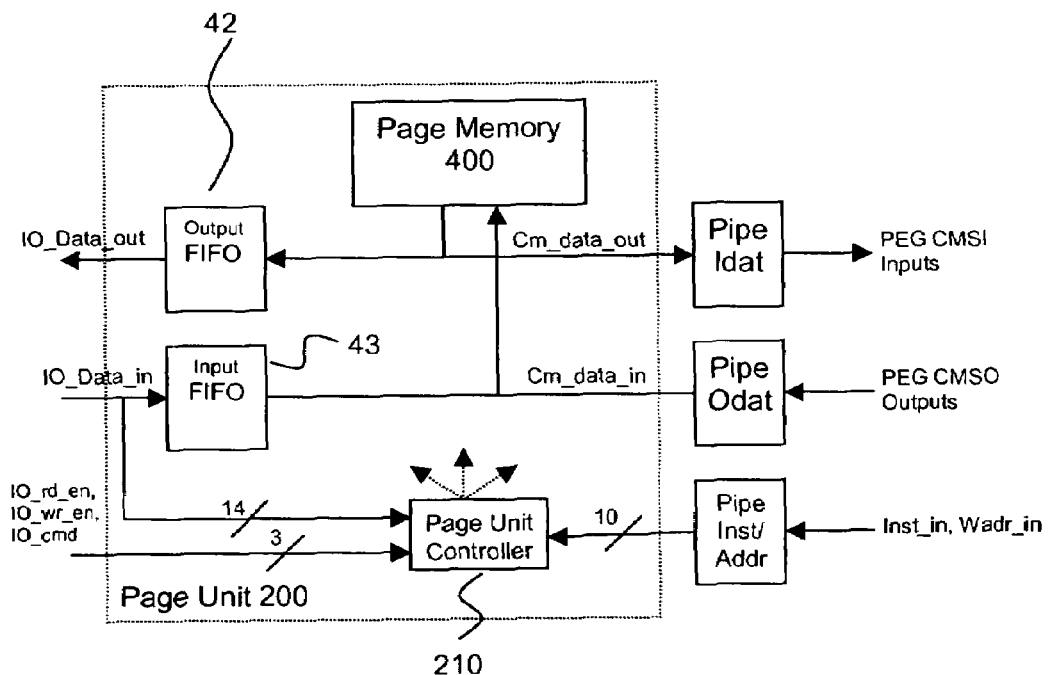

FIG. 15

IO_Data Bus Signals

| 64 | I | IO_Data_in |
|----|---|------------|
| 64 | O | IO_Data_out |
| 1  | O | IO_rd_en_out |
| 1  | O | IO_wr_en_out |
| 1  | O | IO_cmd_out |

Sequence for 2-bit Page Out

| | | |
|---|---|---|
| 1 | CM = Aram(0) | |
| 2 | CM = shift south | |
| 3 | CM = shift south | |
| 4 | CM = shift south | wr_en |
| 5 | CM = shift south | wr_en |
| 6 | CM = shift south | wr_en |
| 7 | CM = shift south | wr_en |
| 8 | CM = shift south | wr_en |
| 9 | CM = Aram(1) | wr_en |
| 10 | CM = shift south | wr_en |
| 11 | CM = shift south | wr_en |
| 12 | CM = shift south | wr_en |
| 13 | CM = shift south | wr_en |
| 14 | CM = shift south | wr_en |
| 15 | CM = shift south | wr_en |
| 16 | CM = shift south | wr_en |
| 17 | | wr_en |
| 18 | | wr_en |
| 19 | | wr_en |

FIG. 24

Table 2 – Sequence for 2-bit Page In

|   |   |   |   |
|---|---|---|---|
| 1 |   |   | rd_en |
| 2 |   |   | rd_en |
| 3 |   |   | rd_en |
| 4 |   |   | rd_en |
| 5 |   | CM = shift north | rd_en |
| 6 |   | CM = shift north | rd_en |
| 7 |   | CM = shift north | rd_en |
| 8 |   | CM = shift north | rd_en |
| 9 |   | CM = shift north | rd_en |
| 10 |   | CM = shift north | rd_en |
| 11 |   | CM = shift north | rd_en |
| 12 |   | CM = shift north | rd_en |
| 13 | Wram(0)=Cm | CM = shift north | rd_en |
| 14 |   | CM = shift north | rd_en |
| 15 |   | CM = shift north | rd_en |
| 16 |   | CM = shift north | rd_en |
| 17 |   | CM = shift north |   |
| 18 |   | CM = shift north |   |
| 19 |   | CM = shift north |   |
| 20 |   | CM = shift north |   |
| 21 | Wram(1)=Cm |   |   |

FIG. 25

METHOD AND APPARATUS FOR HIGH DENSITY STORAGE AND HANDLING OF BIT-PLANE DATA

CROSS-REFERENCE TO RELATED APPLICATIONS

This application claims the benefit of U.S. Provisional Application No. 60/560,473, filed Apr. 8, 2004, the disclosure of which is hereby incorporated herein in its entirety by reference.

FIELD OF THE INVENTION

This invention relates to bit-plane data storage in an image processing system, and in particular, in a SIMD array architecture.

BACKGROUND OF THE INVENTION

Parallel processing architectures employing the highest degrees of parallelism are those following the Single Instruction Multiple Data (SIMD) approach and employing the simplest feasible Processing Element (PE) structure: a single-bit arithmetic processor. While each PE has very low processing throughput, the simplicity of the PE logic supports the construction of processor arrays with a very large number of PEs. Very high processing throughput is achieved by the combination of such a large number of PEs into SIMD processor arrays.

A variant of the bit-serial SIMD architecture is one for which the PEs are connected as a 2-d mesh, with each PE communicating with its 4 neighbors to the immediate north, south, east and west in the array. This 2-d structure is well suited, though not limited to, processing of data that has a 2-d structure, such as image pixel data.

SUMMARY OF THE INVENTION

The present invention in one aspect provides a digital data processing system comprising:
- an array of processing elements, having first data storage means, adapted to process bit-plane data;
- second data storage means, coupled to the first data storage means, adapted to store bit-plane data not needed for immediate processing;
- a data path between the primary data storage means and the secondary data storage means, said data path being wider than one bit-line and narrower than one bit-plane.

In another aspect, the present invention provides a digital data processing system comprising:
- an array of processing elements having first storage means, adapted to process bit-plane data;
- a pack matrix, coupled to the array of processing elements, said pack matrix comprising an array of registers, adapted to receive and store a data word containing multiple pixels in a single cycle and to store the pixels from the data word individually in raster order.

In yet another aspect, the present invention provides a digital data processing system comprising:
- an array of processing elements, having first data storage means, adapted to process data in bit-plane form;
- a pack matrix, coupled to said array of processing elements, comprising an array of registers and adapted to store pixel data individually in raster order and to generate data words each containing data relating to multiple pixels and to convey said data words in a single clock cycle per data word.

Further details of different aspects and advantages of the embodiments of the invention will be revealed in the following description along with the accompanying drawings.

BRIEF DESCRIPTION OF THE DRAWINGS

In the accompanying drawings:

FIG. 14 is a graphical illustration listing page memory criteria and providing performance ratings for the exemplary approaches.

FIG. 15 is a schematic diagram showing the major components and data paths of a Page Unit.

FIG. 24 is a graphical representation listing the sequence of commands required to page out a 2-bit (plane) image.

FIG. 25 is a graphical representation listing the sequence of commands required to page in a 2-bit (plane) image.

DETAILED DESCRIPTION OF THE INVENTION

Figure 1:
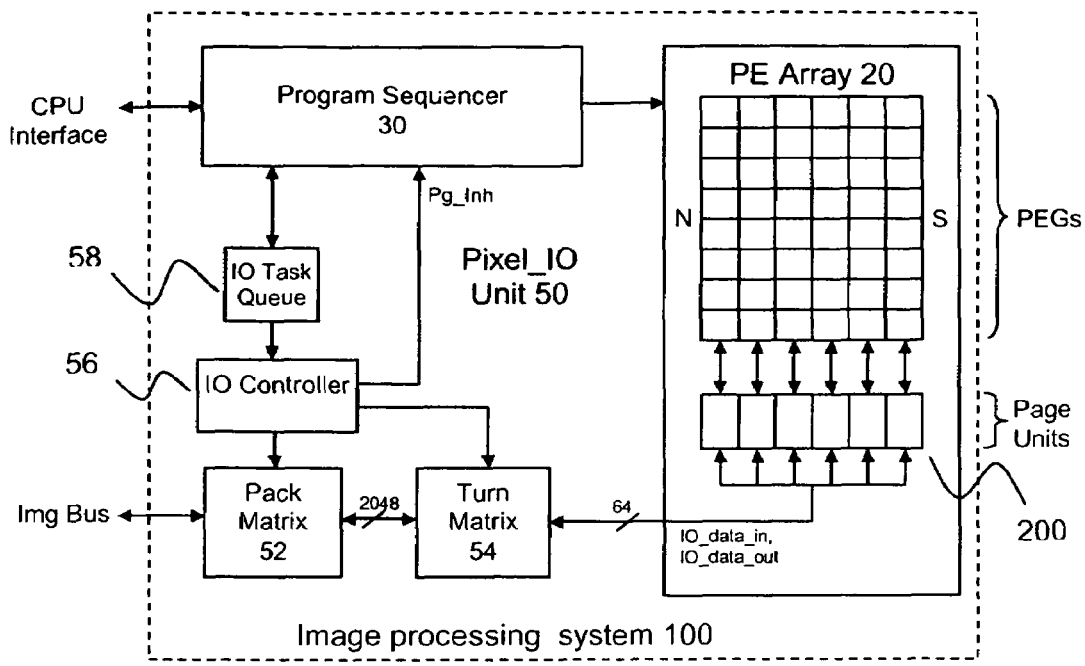
FIG. 1 is a schematic diagram illustrating components and data paths of an image processing system built in accordance with the present invention.

Reference is first made to FIG. 1 illustrating an exemplary image processing system 100 built in accordance of the present invention. In this example of the present invention image processing system 100 comprises processing element (PE) array 20, a plurality of page units 40, program sequencer 30, I/O controller 56, I/O task queue 58, pack matrix 52, and turn matrix 54.

Figure 2:
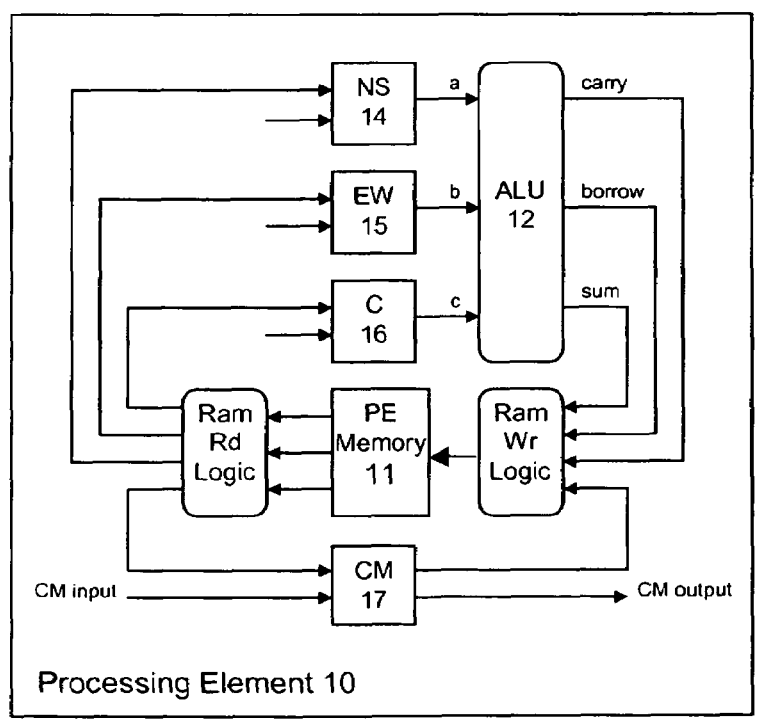
FIG. 2 is a schematic diagram illustrating a typical processing element architecture.

Each processing element (PE) for such a typical SIMD array, as illustrated in FIG. 2, comprises PE memory 11, arithmetic and logic unit (ALU) 12, and registers NS 14, EW 15, and C 16, for processing 1-bit data. ALU 12 may be as simple as a full adder circuit, or, in more elaborate examples, may include more advanced arithmetic capabilities. A set of registers load pixel data from PE memory 11 for processing by ALU 12. CM 17, in this example, is a register to provide for input and output of pixel data.

PE memory 11 is effectively 1-bit wide for each PE and stores pixel data for processing by the PE. Multi-bit pixel values are represented by multiple bits stored in PE memory 11. Operations on multi-bit operands are performed by processing the corresponding bits of the operand pixels in turn. In some examples of a SIMD Array, the PE memory 11 is 3-port, performing 2 reads and 1 write per cycle. Other examples include those employing other multi-access approaches and those providing a single read or write access per cycle. In the 3-port example, processing of a 1-bit operation step may be performed in a single cycle, whereas for other approaches, additional cycles may be required for the PE memory accesses.

Figure 3:
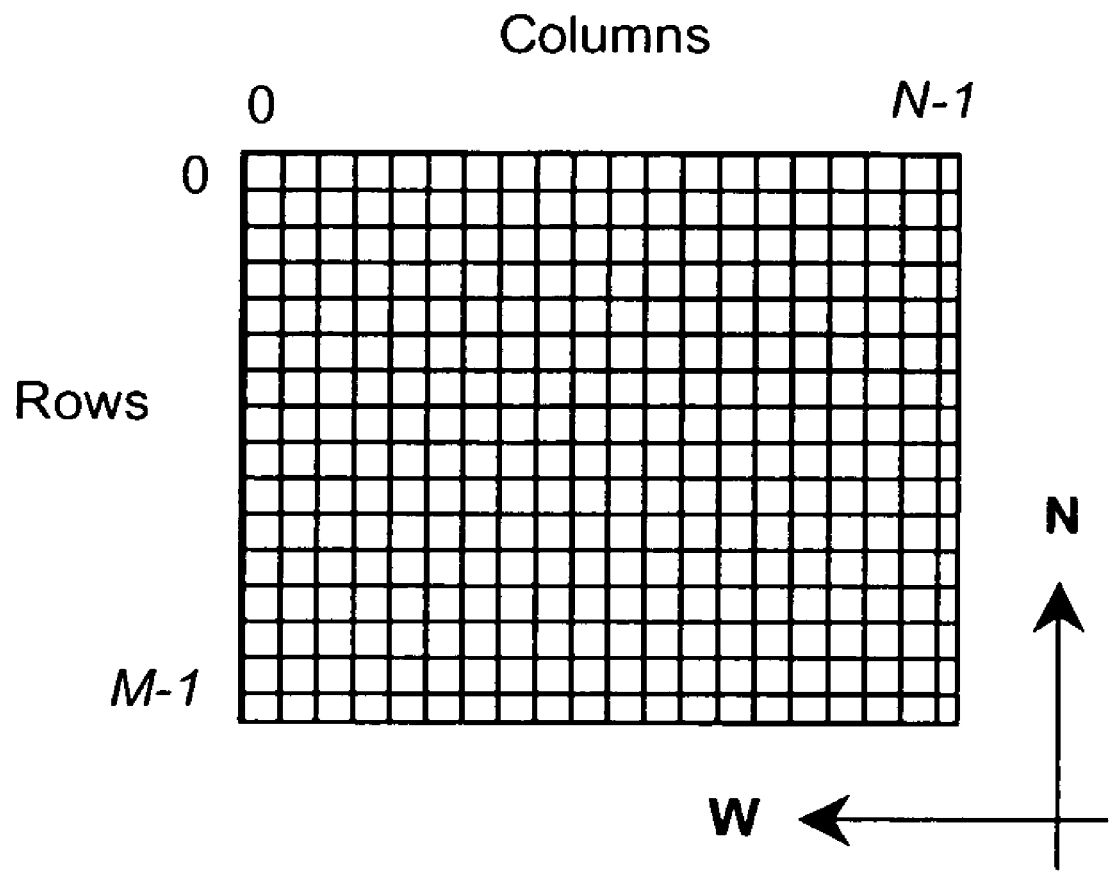
FIG. 3 is a graphical representation of a PE array.
Figure 4:
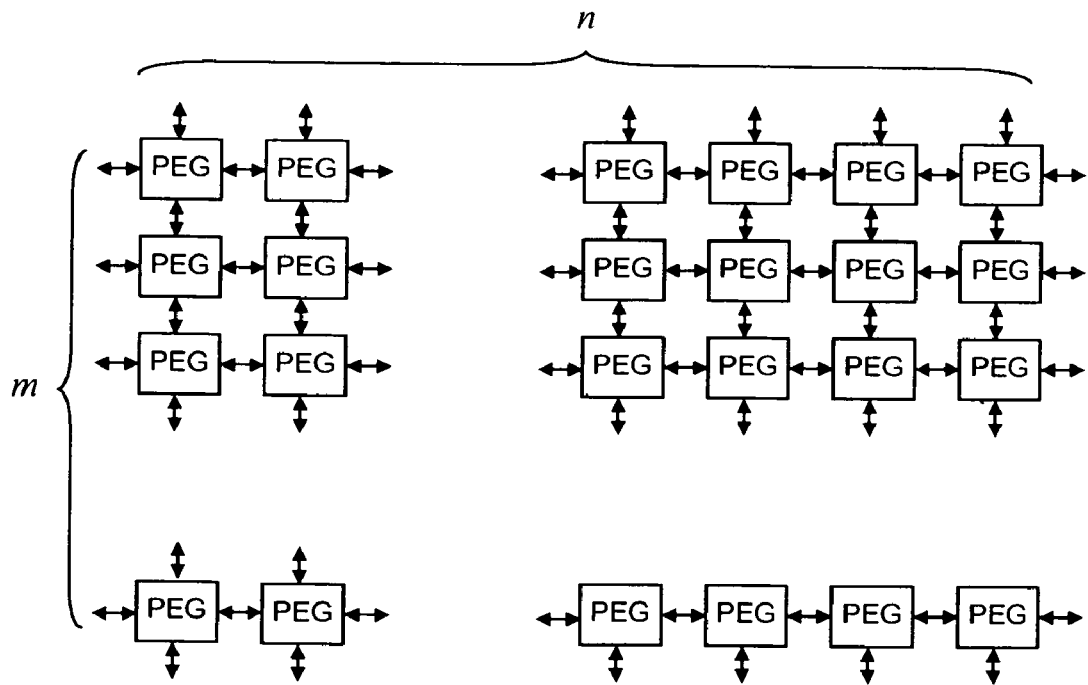
FIG. 4 is a graphical representation of a PE array comprising an array of PE Groups.
Figure 5:
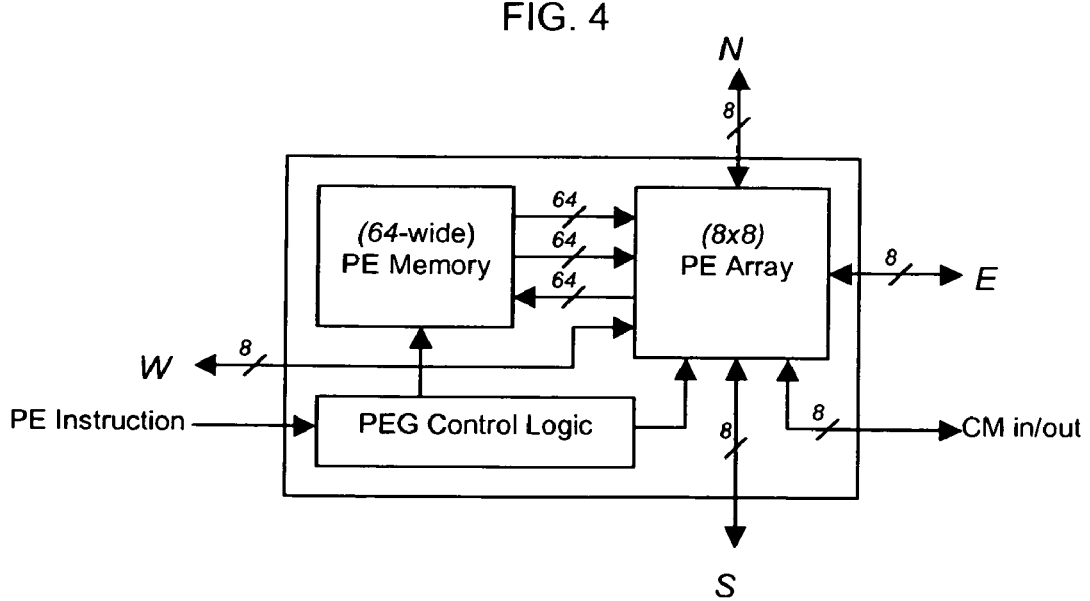
FIG. 5 is a schematic diagram illustrating the components and data paths of a PE Group.

Array 20 comprises some number M of rows and some number N of columns of PEs as shown FIG. 3. pixel numbering proceeds from 0,0 at the northwest corner of the array to M−1, N−1 at the southeast corner. The PEs of the SIMD array are connected in a grid pattern, each PE 10 communicating with its 4 nearest neighbors only. The PE-to-PE communication paths are 1-bit in width and bi-directional.

During processing, all PEs of array 100 perform each operation step simultaneously. Every read or write of an operand bit, every movement of a bit among PE registers, every ALU output is performed simultaneously by every PE of the array. In describing this pattern of operation, it is useful to think of corresponding image bits collectively. An array-sized collection of corresponding image bits is referred to as a "bit-plane". From the point of view of the (serial) instruction stream, SIMD array operations are modeled as bit-plane operations.

Each instruction in array 20 comprises commands to direct the flow or processing of bit-planes. A single instruction contains multiple command fields including one for each register resource, 1 for the PE memory 11 write port, and an additional field to control processing by ALU 12. This approach is a conventional micro-instruction implementation for an array instruction that provides array control for a single cycle of processing.

The present invention, in general, relates to a data processing system. The illustrated examples given throughout this disclosure are related to image pixel data. It should be noted that the scope of this invention is not limited to pixel data and image processing and it applies to other systems of digital data processing using SIMD architecture.

Although operations on array data are effectively operations on pixel data, the data is physically stored and operated upon in terms of bit-planes. Data provided to image processing system 100 in pixel form must be converted to bit-plane form for processing.

Array 20 processes image data in array-sized segments known as "subframes". In a typical scenario, the image frame to be processed is much larger than the dimensions of array 20. Processing of the image frame is accomplished by processing subframe image segments in turn until the image frame is fully processed.

Perhaps the most fundamental design decision concerning the SIMD array is the depth and structure of the PE memory. Since PE memory 11 comprises 50-70% of the image processing system 100 logic, the depth of the PE memory 11 largely determines the feasible dimensions of the SIMD array for a given die space. In the design of a Image processing system 100, the PE memory 11 depth is made as minimal as possible while supporting the memory requirements for the anticipated application set.

For optimal processing throughput, PE memory 11 is configured for full bit-plane access. For a given read or write access, each PE sends or receives a single bit so that the overall bandwidth is a full bit-plane. In the exemplary array of FIG. 3, this implies M×N bits for each memory access (normally thousands or tens of thousands of bits). Additionally, the PE memory 11 is typically multi-access for even greater throughput. In the 3-port example above, 2 reads and 1 write may be performed during any clock cycle. The overall memory bandwidth for this example is therefore 3 bit-planes.

Since the PE memory 11 is typically multi-access, extremely wide, but of minimal depth, it is likely that it will be very low density. For this reason, a two-tiered approach to SIMD array memory has been followed. In addition to PE memory 11, a second memory known as page memory provides storage of subframe data. The page memory 40 is single-port and may be partitioned differently from PE memory 11, providing much higher density data storage.

The page memory 40 provides storage for subframe data that is not currently being processed. Data is moved from the page memory 40 to the PE memory 110 when it is required for processing. Data is moved from PE memory 110 to page memory 40 when it is not immediately required for processing.

Figures 8, 9:
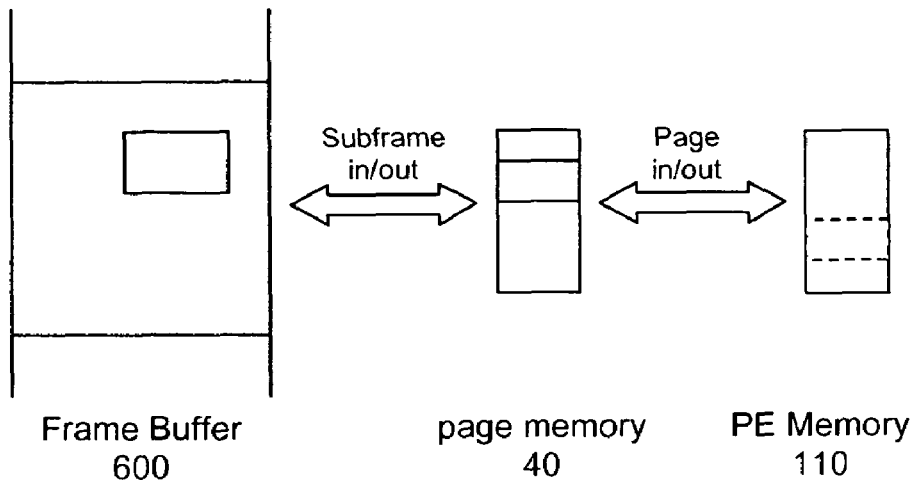
FIG. 8 is a graphical representation of the subframe i/o and paging processes.
FIG. 9 is a graphical representation listing the performance criteria of a page memory implementation.
Figure 10:
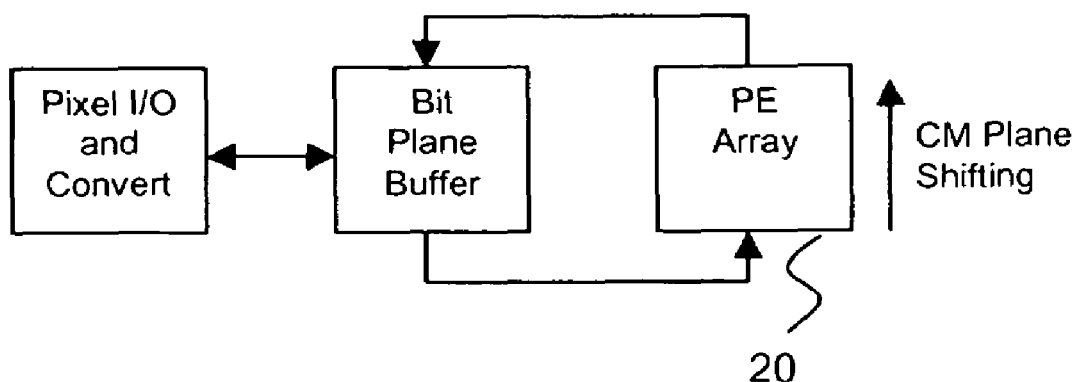
FIG. 10 is a graphical representation of a typical image processing system employing paging with bit-line access.
Figure 11:
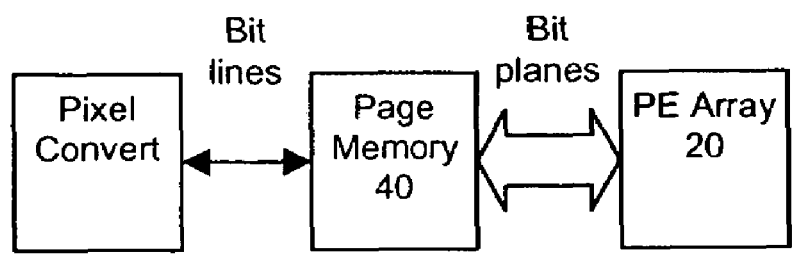
FIG. 11 is a graphical representation of a typical image processing system employing paging with bit-plane access.

A second use for the page memory 40 is to provide storage for data that is currently being moved between the PE array 20 and an external image frame. Since the page memory 40 is not used for processing, it may be used for subframe input and output without interrupting processing. As shown in FIG. 8, a subframe is selected from an image frame and is moved into the page memory 40. From the page memory 40, the subframe is moved to the PE memory 110 for processing.

The use of page memory 40 to provide subframe i/o that is concurrent with SIMD array processing is a significant benefit to the Image processing system 100. The subframe i/o timeline may be similar in duration to the processing timeline. If concurrency of subframe i/o and processing were not provided, the performance of the Image processing system 100 would be reduced by nearly half in some instances.

The paging of data between the PE array 20 and the page memory 40 is similar to subframe i/o in some respects. Depending on the structure of the page memory 40 and the manner in which it is coupled to the PE array 20, paging may be a foreground SIMD array task, or may be concurrent with SIMD array processing. Concurrency of paging is a performance benefit, though of less significance than concurrency of subframe i/o.

The performance of the page memory 40 and subframe i/o support logic for a Image processing system 100 may be characterized by several measures, enumerated in FIG. 9.

The page memory 40 density depends on the structure of the memory used and its distribution with respect to the PE array 20. High density is important in order to provide the greatest amount of storage while using the least die space. The page memory 40 structure and distribution will also determine the bandwidth of paging. High paging bandwidth allows paging to be performed with low latency in the availability of paged data. To the extent that paging is concurrent, its cost on the foreground process is minimized.

The subframe i/o bandwidth largely depends on the throughput of the i/o support logic. A higher subframe i/o bandwidth will support greater throughput to reduce the overall i/o timeline. Higher subframe i/o bandwidth also means lower latency for subframe availability. Occasionally, the foreground processing task must unavoidably wait on subframe i/o, and this makes subframe i/o a direct foreground cost in these instances. Of less significance is the cost of concurrent subframe i/o on the foreground task and any cross-costs of paging and subframe i/o on each other.

The above performance measures will be discussed with respect to two approaches employed by image processing systems in the prior art and with respect to the exemplary embodiment.

For some early SIMD array processors, there was no on-chip page memory. An example of such a processor is illustrated by FIG. 8. Pixel data is received and is converted to bit-plane form prior to storage in a buffer memory. Subframe data is provided to the PE array in bit-plane form. The PE array processes the data and sends the results to the buffer memory. The processing results are converted to pixel form for output.

During subframe input, each bit-plane is shifted into the PE array 20 via the south array boundary. The bit-plane is shifted into the CM register plane of the array at the rate of one bit-line (i.e. 1 bit-plane row) per cycle. Once the entire bit-plane is received, the CM plane is stored to PE memory 110 in a single cycle. Subframe output is the reverse process. A bit-plane is loaded to the CM plane from PE memory 110, then is shifted out of the array via the north boundary and stored in the buffer memory.

Because the buffer memory is off-chip in this approach, its depth is configurable based on the needs of the system. However, paging bandwidth is quite low at 1 bit-line per cycle. Paging requires M clocks per bit-plane in this system. The foreground cost of paging is low at 1 clock per plane (for load or store of the CM plane). Based on the buffer memory width, the subframe i/o bandwidth for this system is the same as the paging bandwidth. However, unless the buffer memory is multi-access, paging and subframe i/o could not be concurrent with each other, creating a cross-cost between paging and subframe i/o when they conflict in the timeline.

A second approach provides a page memory 40 on-chip with the PE array 20. In this approach, the page memory 40 is a single port memory integrated closely with the PE array 20. PE array 20 access to the page memory 40 is bit-plane width, meaning an entire bit-plane may be loaded or stored between the page memory 40 and a register plane in the PE array 20 in a single cycle.

Pixel conversion logic is also included on-chip, allowing subframe i/o with the external image frame to be in pixel form. The task of converting between pixel form and bit-line form is performed by the pixel conversion logic. The formation of bit-planes from bit-lines is enabled by providing bit-line access to the page memory 40 by the pixel conversion logic.

This second approach has high paging bandwidth at 1 bit-plane per cycle. The foreground cost for paging is also low at 1 clock per bit-plane. However, in this approach, the page memory 40 density is low because of the extreme width (M*N bits) and because the page memory 40 is structured to provide bit-line access, thereby requiring separate read/write controls for each bit-line of the PE array 20.

Subframe i/o bandwidth for each chip is fairly low, being constrained by a 32-bit pixel width. (This may be mitigated by providing separate i/o paths to each chip in a multi-chip system.) There is no foreground cost for subframe i/o since access to the page memory 40 by the subframe i/o logic is independent of the PE array 20. Because a single access by the subframe i/o logic is required for each bit-line of a subframe, cross-costs between subframe i/o and paging are quite high. This is mitigated by the high bandwidth of paging and by scheduling paging and i/o operations so that they do not coincide.

Figure 6:
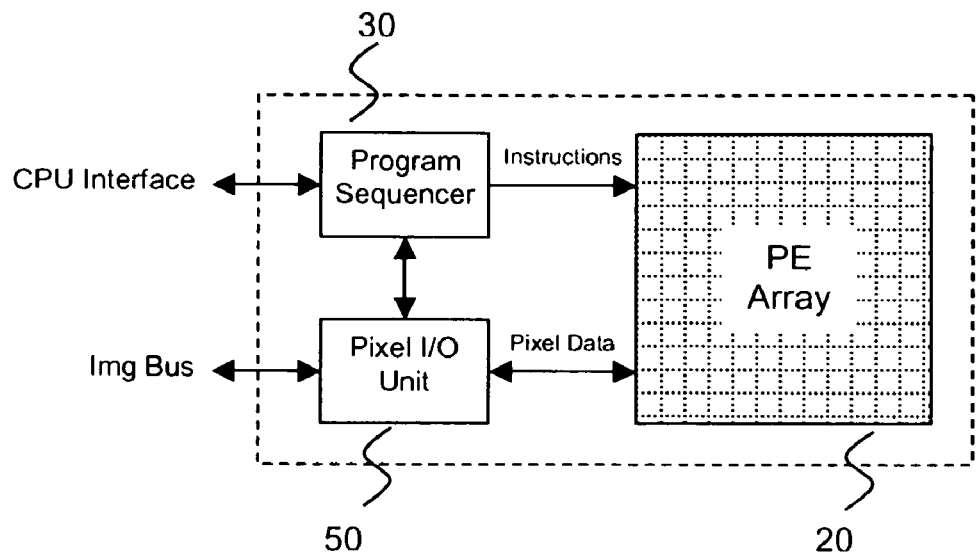
FIG. 6 is a graphical representation of an image processing system showing the major components and data paths.

An exemplary Image processing system 100 is shown in FIG. 6. The Image processing system 100 includes a Program sequencer 30 unit to provide the stream of instructions to the PE array 20. A pixel I/O unit 50 is also provided for the purpose of controlling the movement of pixel data in and out of the PE array 20. Collectively, these units comprise a Image processing system 100.

The Image processing system 100 may be employed to perform algorithms on array-sized image segments. This processor might be implemented on an integrated circuit device or as part of a larger system on a single device. In either implementation, the Image processing system 100 is subordinate to a system control processor, referred to herein as the "Cpu". An interface between the Image processing system 100 and the Cpu provides for initialization and control of the exemplary Image processing system 100 by the Cpu.

The pixel I/O unit 50 provides control for moving pixel data between the PE array 20 and external storage via the Img Bus. The movement of pixel data is performed concurrently with PE array 20 computations, thereby providing greater throughput for processing of pixel data. The pixel I/O unit 50 performs a conversion of image data between pixel form and bit-plane form. Img Bus data is in pixel form and PE array 20 data is in bit-plane form, and the conversion of data between these forms is performed by the pixel I/O unit 50 as part of the i/o process.

The exemplary PE array is hierarchical in implementation, with PEs partitioned into PE groups (PEGs). Each PEG comprises 64 PEs representing an 8×8 array segment. The 48×64 PE array 20 is therefore implemented by 6 rows of PEGs, each row having 8 PEGs. Each PEG is coupled to its neighboring PEGs such that PE-to-PE communication is provided across PEG boundaries. This coupling is seamless so that, from the viewpoint of bit-plane operations, the PEG partitioning is not apparent.

The exemplary PEG unit comprises a 64-bit wide multi-access PE memory 110, PEG-level instruction handling logic, and the register and computation logic making up the 64 PEs. Each bit slice of the PE memory 110 is coupled to one of the 64 PEs, providing an effective 1-bit wide PE memory 110 for each PE.

In addition to communication with north, south, east and west neighbors, each of the exemplary PEGs includes an 8-bit input and output path for moving pixel data in and out of the PE array 20. The CM register plane provides handling of bit-plane data during the input and output. Data is moved in and out of the PE array 20 in bit-plane form.

In an exemplary system employing the image processing system 100, a frame buffer 600 provides storage for image data external to the image processing system 100. The frame buffer 600 communicates with the image processing system 100 via the Img Bus interface. To meet bandwidth requirements, the width of the Img Bus interface is 64-bits.

Figure 7:
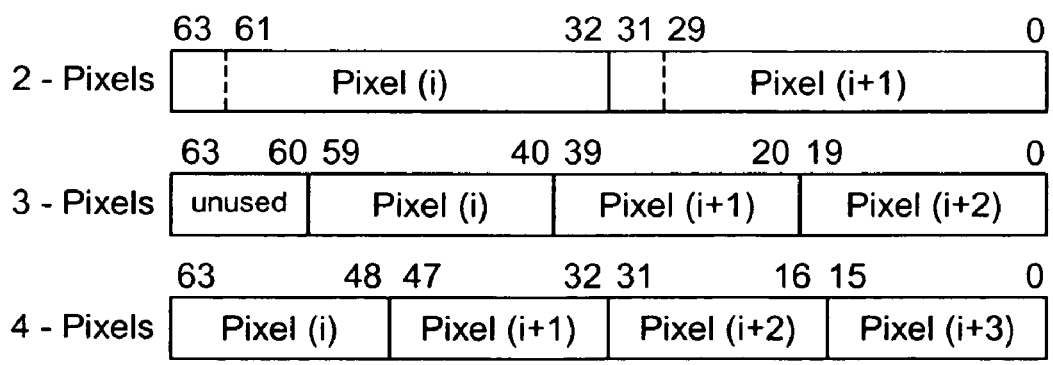
FIG. 7 is a graphical representation of the data format for the exemplary data word comprising packed pixel values.

Pixel data is stored in 64-bit multi-pixel words, as shown in FIG. 7. Three packing formats are supported: 2 pixels per word (30- or 32-bit pixel data), 3 pixels per word (20-bit), and 4 pixels per word (16-bit). Pixels are packed in consecutive horizontal scan order. Within the data word, earlier pixels are located toward the most significant end of the word. pixels are aligned with bit 0, the least significant end of the word, so any unused bits are at the most significant end.

During input and output of subframe data, the data words are moved in horizontal scan order. Therefore, the pixel at the least significant end of a data word is followed by the next pixel in the image frame, which is stored toward the most significant end of the next data word in the sequence.

The first data word for each subframe line is aligned so that the first pixel of the subframe line is the first pixel of the data word. In other words, a subframe line does not begin in the middle of a data word. This alignment may be achieved by restricting the granularity of subframe boundaries to multiple-of −2, −3 or −4 pixels (depending on pixel packing). Alternatively, the frame buffer interface logic may perform a pixel re-packing function to ensure the alignment of each subframe line.

The pixel packing method described herein is the one followed for the exemplary system. Other pixel orders and storage constraints might be contemplated within the overall data handling scheme described.

Previous page memory approaches have suffered from drawbacks. The first approach (bit-line paging) described above provided very high density of data storage, but very low paging bandwidth, leading to minimal utility of the page memory for the purpose of temporary image data storage. The second approach (bit-plane paging) provides very high paging bandwidth, leading to exceptional utility for the purpose of temporary image data storage. However, this approach suffers from low density, meaning that PE density must be sacrificed to some extent to accommodate page memory. Fewer PEs means lower performance for a given die space.

Embodiments of the present invention implement a page memory 40 that exhibits acceptably high paging bandwidth while retaining high density of data storage. In a classic trade off of bandwidth and density, an intermediate approach is taken wherein the page memory 40 width is effectively $\frac{1}{8}^{th}$ bit-plane. This is 6 times the width of a bit-line approach and $\frac{1}{8}^{th}$ the width of a bit-plane approach. At the resulting dimensions, the density of single-port memory units is sufficiently high that little would be gained from going to a narrower data width approach.

Figure 12:
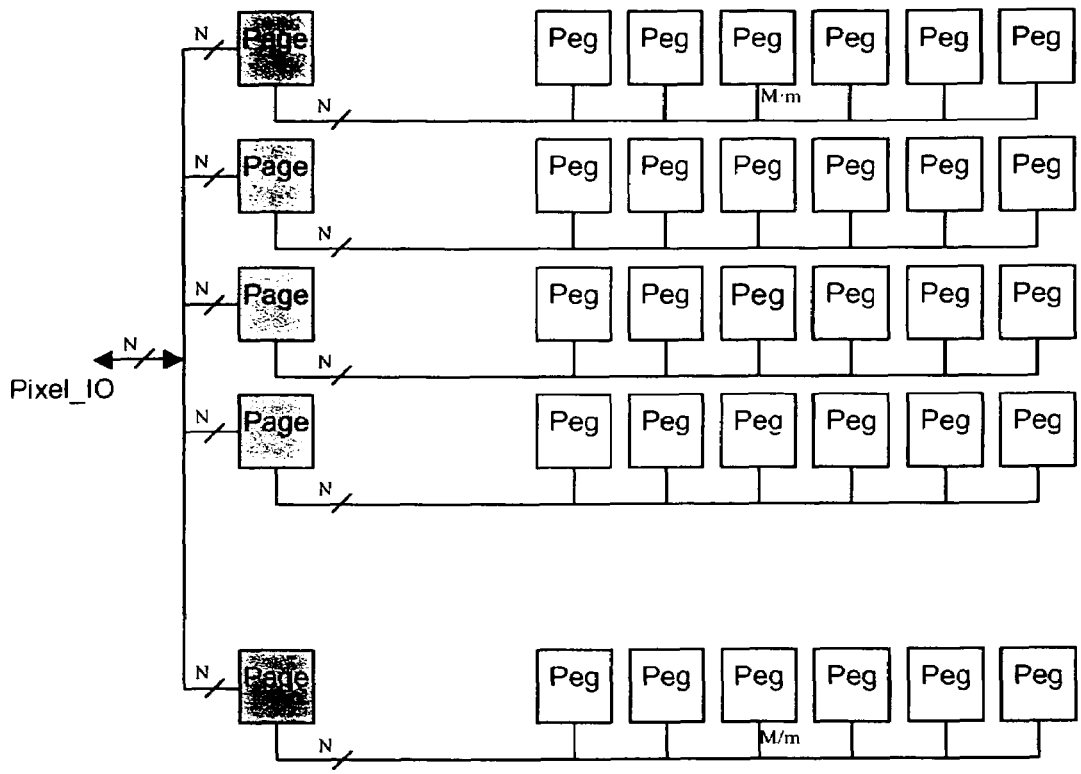
FIG. 12 is a graphical representation of the situation of page units with respect to the array of PEGs.
Figure 13:
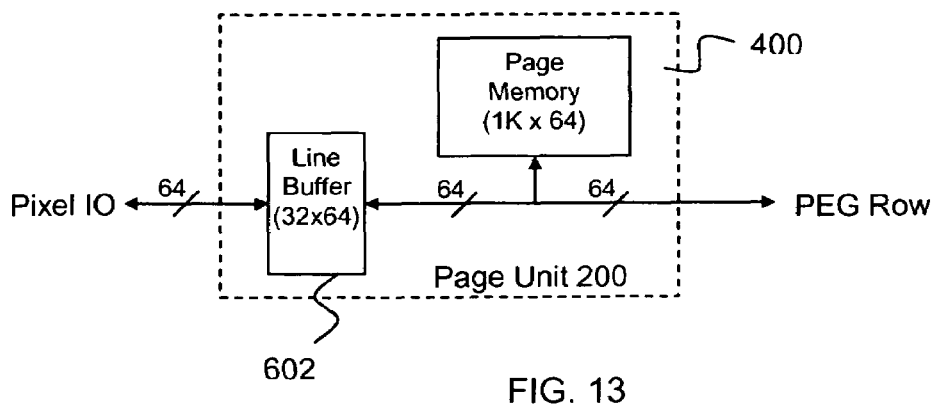
FIG. 13 is a graphical illustration of a page unit showing memory components and data paths.

The page memory 40 of the present invention is distributed among and supported by page units, each page unit 200 comprising a single page memory 40. page units are distributed so that each row of PEGs is supported by a page unit 200 (see FIG. 12). Each page memory 40 is 1 bit-line (64 bits) in width and stores and communicates data in bit-line form.

Each page memory 40 of the exemplary embodiment is a 1024×64 single port memory, accommodating 1024/8=128 bit-planes. The bit-line data is distributed so that each PEG comprises an 8-bit slice (of the bit-line) corresponding to the PEG's position in the array. To move a bit-plane between the PEGs and the page units requires moving 8 bit-lines for each page unit 200 (and PEG row).

The paging of a bit-plane is performed by moving the 8 bit-lines comprising the PEG row bit-plane segment between each PEG row and its page unit 200. Each PEG employs a CM plane that shifts bit-plane data in and out of the PEG without affecting foreground computations. Only the load or store of CM requires a cycle to be stolen from the foreground PE array 20 task. In this embodiment, therefore, the paging of an image requires only 1 clock per bit-plane from the foreground task. The latency, however, is 8 clocks per bit-plane.

The pixel I/O unit 50 communicates with the 6 page units via a common 64-bit bus. The pixel I/O unit 50 has a throughput of 1 bit-line per clock, and only moves data to or from a single page unit 200 during a given cycle. Since the pixel I/O unit 50 processes pixel data in units of subframe lines, the pattern of data movement is to move all bit-lines for a subframe line to or from the page unit 200 corresponding to that subframe line's position, then move on to the next subframe line.

Each page unit 200 employs a line buffer 602 to hold bit-line data as it is moved between the page unit 200 and the pixel I/O unit 50. The pattern of data movement by the pixel I/O unit 50 is to move a subframe line to/from a page unit, then move a subframe line to/from the next page unit, and so on. In this manner, the page unit line buffer need be only 1 subframe line in depth. This also allows data to be staged in page unit line buffers so that all page units transfer data between their line buffers and the page memory 40 at the same time. This guarantees that the page memory 40 is only accessed at the highest possible bandwidth (i.e. $\frac{1}{8}^{th}$ plane).

Since the pixel I/O unit 50 addresses the page units in turn, the pattern of subframe line movement is to skip by 8 between pixel lines of the image. So, for example, the movement of pixel line 0 to the first page unit would be followed by the movement of pixel line 8 to the second page unit, and so on. This pattern of data movement is necessary in order to both limit line buffers to a single subframe line in depth and provide for simultaneous transfer of data between the line buffer and the page memory 40 for all page units.

The use of line buffers also allows the page memory 40 to be available for paging data in or out of the PE array 20 any time a transfer between line buffer and page memory 40 is not occurring. Regardless of pixel size (16, 20 or 32-bit), the transfer of $\frac{1}{8}^{th}$ subframe image (i.e. 1 subframe line per PEG row) is performed in the same time as required for the pixel I/O unit 50 to move a single subframe line. It may be seen, therefore, that in the exemplary embodiment an active subframe i/o task only requires access to the page memory 40 for $\frac{1}{6}^{th}$ of the time overall.

To summarize, the page memory implementation herein presented by way of example for an embodiment of the present invention permits a page memory 40 of high, though not the highest, density. The paging bandwidth is acceptably high, providing for fairly low-latency paging. To the extent that concurrency of paging is feasible, the foreground cost of paging is very low. And, through the use of line buffers, the cross-cost between paging and subframe i/o is kept low.

A comparison of page memory approaches shows that embodiments of the present invention provide high page memory density. Though it is not as high as that of the first approach described (Bit-line approach), it is much higher than that of the second approach described (Bit-plane approach). Subframe i/o bandwidths and foreground costs are similar for all 3 approaches. The paging bandwidth for the invention is better than that of the Bit-line approach, but not as good as the Bit-plane approach. This is mitigated by providing concurrency of paging so that the foreground cost of paging is the same as for the Bit-plane approach when concurrency is employed. (This is downgraded from "Very Low" to "Low" in the table since concurrency is not always feasible.) Finally, because of the line buffers, the cross-cost between paging and subframe i/o is lower for the invention than for either of the other approaches.

Each row of PEGs comprising the PE array 20 is supported by a page unit 200. A page unit 200 comprises a page memory 400, input FIFO 43, output FIFO 42 (described above as a "line buffer") and controller 41. All data path widths within the exemplary page unit 200 are 64-bit, matching the width of the PE array 20. A block diagram of the page unit 200 is shown in FIG. 15.

All data handled by the page unit 200 is in bit-line form. That is, each 64-bit word represents a corresponding bit for each of 64 pixels comprising a pixel line within the image subframe. (For instance, all of the bit 0's for a pixel line would collectively form a bit-line.) Data is stored in the page memory 400 in bit-line form. The CM data flowing between the page unit 200 and the PE array 20 is in bit-line form, and the IO data flowing between the page unit 200 and the pixel I/O unit 50 is in bit-line form.

The exemplary page memory 400 provides storage for 128 bit-planes of image data. Since the PEG units are 8×8, 8 bit-lines for each PEG row comprise a bit-plane. The exemplary page memory 400 is therefore 1 k×64.

Figure 16:
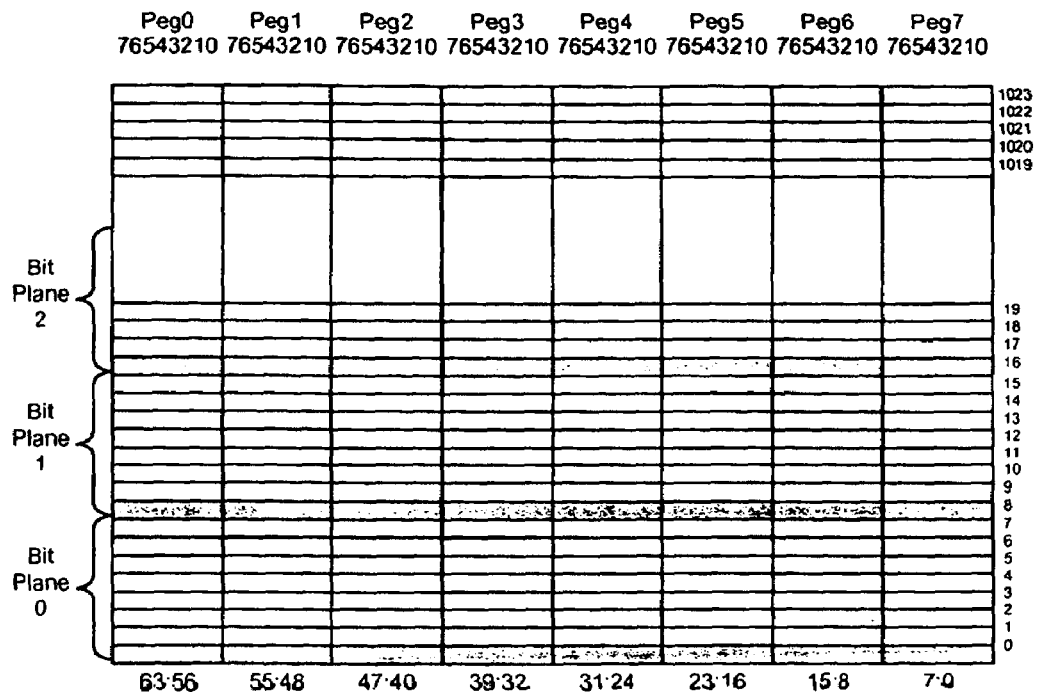
FIG. 16 is a graphical representation of the distribution of bit-line data within a page memory.

The storage of bit-plane data is shown in FIG. 16. The 8 bit-lines for each bit-plane are stored consecutively in row order (numbered from north to south). Each of the exemplary page memory bit-planes 0 through 127 is stored in an 8 bit-line block beginning at the page memory 400 address that is 8 times the bit-plane number.

A page memory subframe image comprises some number of bit-planes stored in the page memory 40. In this exemplary implementation, the bit-planes comprising an image are constrained to form a contiguous block of bit-planes. With this implementation, the subframe image may be represented by an Address attribute and a Size attribute. The Address attribute indicates the start address for the subframe image in units of bit-planes. The Size attribute indicates the number of bit-planes comprising the image. Other, non-contiguous implementations may be contemplated for storage of page memory images.

The exemplary PE array 20 employs a register plane known as CM 17. The data path for input data from the PE array 20 is therefore labeled Cm_data_in, as shown in FIG. 15. Similarly, the data path for output data to the PE array 20 is labeled Cm_data_out. In the exemplary PE array 20, these data paths are coupled to distribution networks (Pipe Odat, etc.), allowing the data to be distributed to and from the array in stages.

The exemplary PE array 20 performs CM shifting in a south-to-north direction during input, and north-to-south during output. Paging in, therefore requires moving each bit-plane into the PE array 20 in bit-line order, the page memory address counting up by 1 for each bit-line. This ordering results in the lower-numbered bit-lines being oriented toward the north PEG boundary. Paging out requires moving each bit-plane from the PE array 20 in reverse row order. This reverse ordering is accommodated by the address generation of the control block within the page unit 200, such that the bit-lines are stored in the page memory 400 in the proper order.

The pixel I/O unit 50 provides input and output of subframe data between the page memory 40 and the external frame buffer 600. Conversion of data between a packed pixel form and bit-line form is performed by the pixel I/O unit 50 during subframe i/o. The pixel I/O unit 50 moves and converts data in units of 64-pixel subframe lines.

Each exemplary page unit 200 provides an input FIFO 43 and an output FIFO 42 for sending and receiving data to and from the pixel I/O unit 50. This embodiment is exemplary only. Other approaches might include the use of a single bidirectional FIFO (bi-FIFO) or use of a single dual port memory with suitable control logic. The input and output FIFOs are each capable of storing a single subframe pixel line. Data is moved between the pixel I/O unit 50 and the page unit 200 via the 64-bit IO_data_in and IO_data_out signal paths as shown in FIG. 15.

A pixel line comprises bit-lines that collectively represent the data of the subframe line of pixels. If the pixels are 20-bit, for instance, the pixel line is represented by 20 bit-lines. The exemplary embodiment supports input and output of 16, 20 and 32 bit pixel data. The Input and Output FIFOs are therefore 32 deep by 64 wide, to accommodate the largest pixel size (32-bit). A pixel line is moved in bit order from least significant bit-line (0) to most significant bit-line (Size-1). This order of bit-line movement is followed for both input and output tasks.

During subframe i/o, the order of page memory 400 access is consecutive bit-lines within a pixel line. A given pixel line will represent one of the rows 0 through 7 for the corresponding PEG row. Consecutive bit-lines within a given row are stored at an offset of 8 page memory addresses from each other as shown in FIG. 15. The page memory address pattern for accessing a pixel line is therefore a count-up by 8 from a start address, which is given by Address*8+Row (where Address is the page memory address attribute for the subframe image and Row is a row 0 through 7 representing the pixel line position within the PEG row).

The exemplary Image processing system 100 comprises 6 PEG rows with 6 corresponding page units. During subframe input, pixel lines are moved via the pixel I/O unit 50 to the page units in turn until each page unit 200 has received a pixel line. The pattern of data movement is to move all bit-lines for a pixel line to a page unit, then begin data movement for the next page unit in turn. Data is moved at a rate of 1 bit-line per clock.

Once all page units have received a bit-line, the input FIFO 43, for each page unit 200, contains a subframe line of data, and a transfer of the data from the input FIFO 43 to the page memory 400 begins. This transfer is performed simultaneously by all page units and requires 1 clock per bit-line. Because all units are performing the transfer simultaneously, the transfer takes ⅙ the time required to fill all 6 page unit input FIFOs. During the transfer, subframe input continues, filling the input FIFO 43 of the first page unit 200 while the transfer process empties it.

In the exemplary embodiment, the mechanism to determine when a transfer begins is contained within each page unit 200. All page units track the progress of pixel line input, and upon completion of every $6^{th}$ pixel line input, all page unit begin the transfer. Other embodiments might provide an external control to trigger the transfer by all page units.

During the transfer from input FIFO 43 to page memory 400, access to the page memory 400 by the paging task is inhibited. Whenever no transfer is occurring, access to page memory 400 by the paging task is allowed. It may be seen that in the exemplary embodiment paging tasks may run at about ⅚ full speed during subframe input.

A similar pattern of data movement is performed for subframe output. For output, the transfer from page memory 400 to output FIFO 42 occurs first, then the movement of pixel lines from each page unit 200 in turn to the pixel I/O unit 50 is performed. Again, paging tasks are inhibited during the page memory 400 to output FIFO 42 transfer. Paging tasks may proceed at any time that no transfer is occurring, so that paging tasks run at about ⅚ full speed during subframe output. After the first transfer, subsequent transfers may be performed during subframe output for the $6^{th}$ page unit 200.

Control of the subframe i/o and paging tasks within the page unit 200 is provided by page unit controller 210. The control logic includes state logic to represent ongoing subframe i/o and paging tasks. Subframe i/o and paging tasks may be underway simultaneously, though they may not coincide in accessing page memory 400.

A subframe i/o task is initialized by the receipt of an io_cmd word from the pixel I/O unit 50. The page unit 200 state logic tracks the state of the subframe i/o task and provides address generation for the page memory 400. Clock-to-clock control of data movement is provided by the IO_rd_en and IO_wr_en read and write controls supplied by the pixel I/O unit 50.

A paging task is initialized by receipt of Inst_in and Wadr_in data from the program sequencer 30. The page unit 200 state logic tracks the state of the paging i/o task and provides address generation for the page memory 400. Clock-to-clock control of data movement is provided by control discretes via the Pipe Inst distribution network.

Although paging and subframe i/o tasks may be underway simultaneously, the page memory 400 may be accessed by only one task during a given clock cycle. A mechanism to ensure that page memory accesses do not conflict has been implemented external to the page unit 200 in the exemplary embodiment. This external mechanism is the Pg_Inh (page inhibit) control discrete discussed elsewhere in this specification. Specifically, during the period where the page unit 200 transfers data between page memory 400 and Input or Output FIFOs, access to the page memory 400 by an ongoing paging task is suspended. The suspension of the paging task is effected by inhibiting the clock-to-clock paging control discretes from the Pipe Inst distribution network.

The pixel I/O unit 50 provides input and output of subframe data between the Simd Core and the frame buffer 600. The pixel I/O unit 50 responds to i/o tasks launched by the program sequencer 30 and controls the movement of data between the Img Bus and the page units. Subframe data at the Img Bus is in packed pixel form, but at the PE array interface the data is in bit-line form. The conversion of subframe data between these two formats is a primary function of the pixel I/O unit 50. Subframe i/o is independent of array operations and therefore may be performed concurrently.

In one example of image processing system 100, subframe input and output tasks are dispatched by the program sequencer 30 to an 8-deep I/O task queue 58 in the pixel I/O unit 50 as shown in FIG. 1. The pixel I/O unit 50 removes the input and/or output tasks from the I/O task queue 58 and processes each in turn.

Subframe data is converted between packed pixel form and bit-line form in two steps. The first step is packing and unpacking which is performed in the pack matrix 52. The second step is corner turning with is performed in the turn matrix 54.

The pixel I/O unit 50 handles data in units of subframe lines. As the pack matrix 52 fills with a subframe line, the turn matrix 54 is emptied (and vice versa). When both matrices are ready, a handoff of a subframe line from one to the other takes place. There is a latency of 1 subframe line in the pixel I/O unit 50 due to the pipeline nature of this conversion. (For consecutive i/o tasks that have the same in/out direction, the pipeline is kept full during the transition from one task to the next to avoid a penalty for filling the pipe.)

Data is moved between the pixel I/O unit 50 and the PE array 20 via the IO_data_in and IO_Data_out signal paths in bit-line form. (Subframe data is paged in and out of the page memory 40 in bit-line form as well. Only in the PE array is the subframe data stored and manipulated in terms of whole bit-planes.)

The page units have FIFOs for sending and receiving bit-line data. The bit-line data is periodically transferred between these FIFOs and the page memory 400 itself. During these transfers, it is necessary that any paging operations be inhibited. The pixel I/O unit 50 computes the proper interval and generates the Pg_Inh signal to inhibit the Program sequencer 30 from generating paging instructions during the interval.

Figure 17:
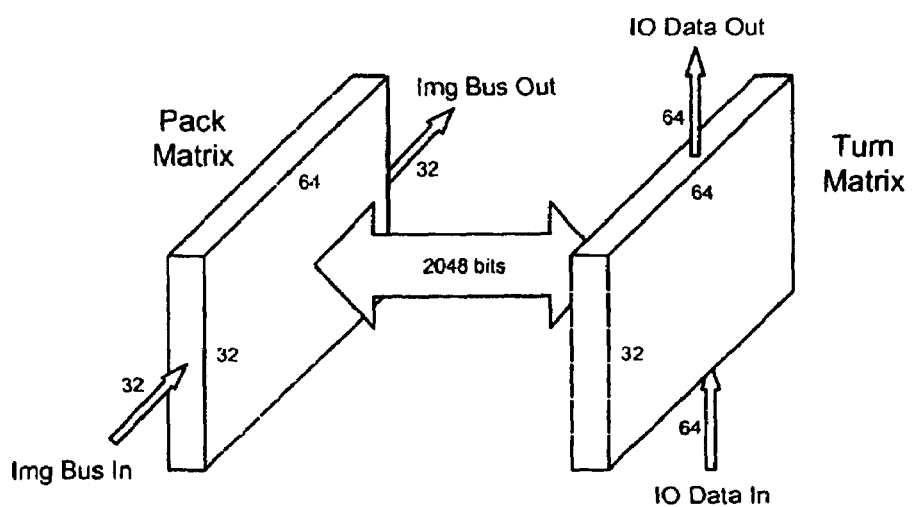
FIG. 17 is a graphical representation illustrating the Pack and Turn matrices and the flow of data through them.

The flow of data for input and output between the page units and the external frame buffer 600 via the Img Bus is illustrated by FIG. 17.

The pack matrix 52 provides packing and unpacking of data between 64-bit frame buffer word (packed pixels) and pixel form. Data flows into the pack matrix 52 from the Img Bus during subframe input, and flows out of the pack matrix 52 to the Img Bus during subframe output.

The turn matrix 54 provides corner turning of data between pixel form and bit-line form. Data flows into the turn matrix 54 via IO_Data_in during subframe output and flows out of the turn matrix 54 to the IO_Data_out during subframe input.

Data is transferred between pack matrix 52 and turn matrix 54 en masse. For subframe input, the 2048 pack matrix 52 bits are transferred to the turn matrix 54 in a single cycle. For subframe output, the 2048 turn matrix 54 bits are transferred to the pack matrix 52 in a single cycle.

Figure 18:
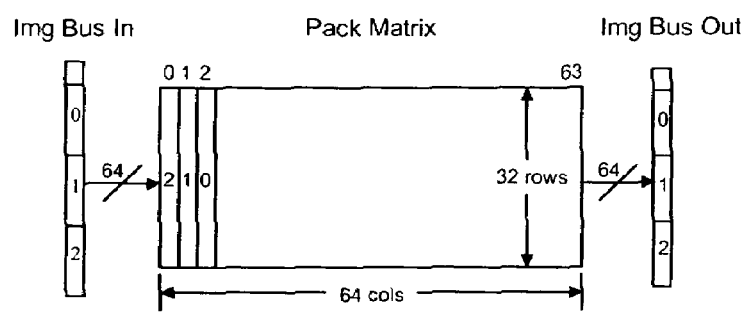
FIG. 18 is a graphical representation illustrating the flow of data through the pack matrix.
Figure 19:
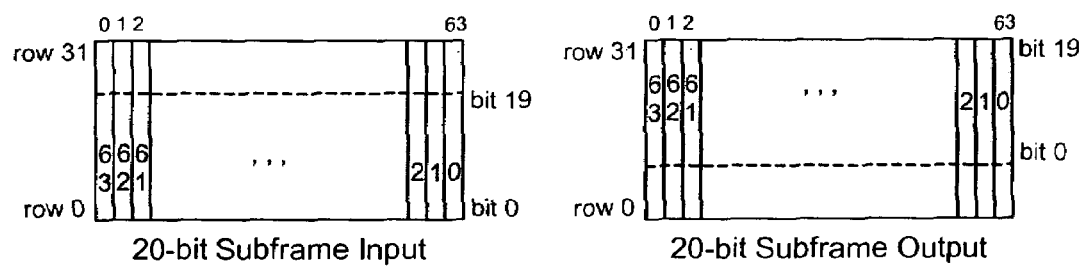
FIG. 19 is a graphical representation illustrating the storage of data in the pack matrix during subframe input and subframe output.
Figure 20:
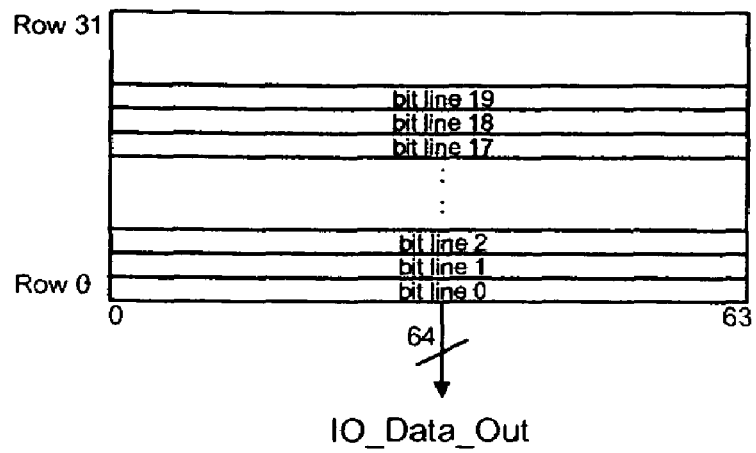
FIG. 20 is a graphical representation illustrating the flow of data out of the Turn Matrix during subframe input.
Figure 21:
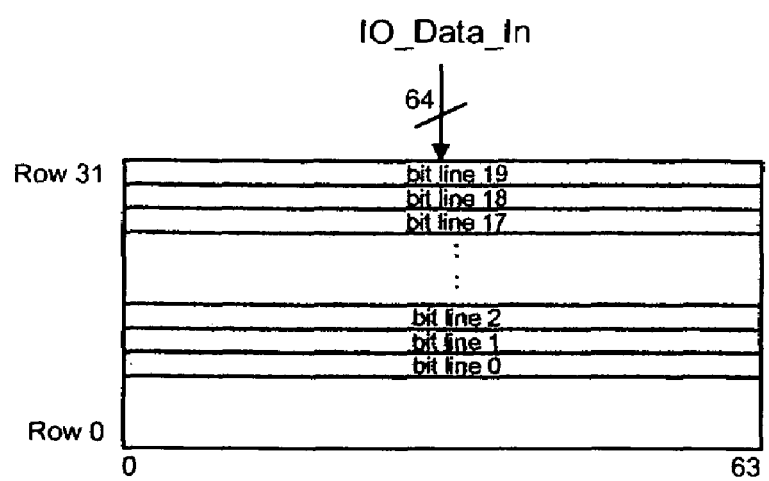
FIG. 21 is a graphical representation illustrating the flow of data into the Turn Matrix during subframe output.

Packing and unpacking of frame buffer word data is performed by the pack matrix 52. The pack matrix 52 is a 64×32 array of registers as shown in FIG. 18. Each of the 64 columns of the pack matrix 52 may contain a pixel, with 16, 20 or all 32 bits in use depending on pixel size (i.e. packing). Pixel data are aligned with the bottom of each column (lsb edge) for subframe input, but is aligned with the top of each column (msb edge) for subframe output (see FIG. 19). (The reason for this difference will be explained in connection with turn matrix operation.)

Pixel data is moved to and from the pack matrix 52 one frame buffer word at a time. Depending on packing, 2, 3, or 4 pixels at a time are shifted in or out of the matrix. The matrix therefore shifts all of its data by 2, 3 or 4 for each input or output cycle.

For subframe input, as each frame buffer word is read from the Img Bus, the pixels are taken from the frame buffer word and are written to the corresponding matrix columns. The lowest pixel in the frame buffer word is written to column 0, the next higher pixel is written to column 1, and so on. This matches the ordering of pixels in the frame buffer word (msb to lsb order) to the order in the matrix (high column to low column).

For subframe output, the pixels are read from the matrix and used to form a frame buffer word to be written to the Img Bus. Again, the highest column (63) provides the highest placed pixel in the frame buffer word, with the next column providing the next pixel and so on.

Each subframe line of pixel data is aligned so that the first word of the line is fully populated and contains the first 2, 3 or 4 pixels for the line. For 16 and 32-bit pixels, all words will be fully populated and aligned. For 20-bit pixels, the $22^{nd}$ (final) word of a pixel line contains only a single valid pixel of 20-bit data, positioned at bits [59:40]. For a subframe input, it is necessary to alter control of the pack matrix 52 for this final word so that it is shifted by 1 instead of 3, and the data at [59:40] is written to column 0 of the matrix. For subframe output, no special handling is required; the extra 2 pixels due to the $22^{nd}$ read are ignored.

The turn matrix 54 converts a subframe line between pixel form and bit-line form. The bit-line data is moved to and from the PE array 20 via the IO_Data_in and IO_Data_out signal paths.

For subframe input, a subframe line of pixel data is transferred from the pack matrix 52 to the turn matrix 54 after it has been received by the pack matrix 52. The pixel data is aligned to the lsb row of each column. After the transfer, row 0 of the turn matrix 54 comprises the first bit-line for the subframe line. A bit-line output is performed by writing row 0 of the turn matrix 54 to IO_Data_out and shifting the matrix down 1 row. The shift places bit 1 of all pixels into row 0 for the next bit-line output. The process is repeated until 16, 20 or 32 bit-lines have been transferred.

For subframe output, the first bit-line (bit-line 0) for a subframe line is received via IO_Data_in and is written to row 31 of the turn matrix 54. The next bit-line that is received (bit-line 1) is written to row 31 and all of the rows are shifted down by 1. This process is repeated until all 16, 20 or 32 bit-lines for a subframe line have been received. Then, a transfer of the subframe line to the pack matrix 52 occurs. Since the last received bit-line (the msb) is in row 31 of the turn matrix 54, the transferred data will be aligned to the msb edge of the pack matrix 52 as mentioned previously.

While there are only 3 packing sizes (16, 20, 32) in the exemplary embodiment, it is possible to perform subframe i/o where the page memory 40 image is smaller than the packing size. For instance, a 10-bit image could be input or output using 16-bit packing. During input, this is achieved by writing only the first 10 bit-lines to IO_Data_out and discarding the remaining bit-lines in the turn matrix 54. To output 10-bit data with 16-bit packing, 10 bit-lines are received from page memory 40 via IO_Data_in after which 0-valued bit-lines are injected to fill the remaining bit-lines (based on the packing size).

The Bit Offset (bos) feature, applicable only to subframe input, allows skipping of some bits in the least significant portion of each pixel. In effect, a bit other than bit 0 is selected as the lsb for each pixel. By using Bit Offset in conjunction with an image size value (Img_size), any contiguous slice of input pixel data may be selected. Bit-line output to IO_Data_out is inhibited for the first Bit Offset number of bit-line shifts of each subframe line by the turn matrix. The number of bit-planes stored in page memory 40 is Img_Size–Bit_Offset. Image slicing does not provide an i/o bandwidth advantage, but does provide a finer degree of control in the management of the page memory 40.

Subframe data is moved between the pixel I/O unit 50 and the page unit of the PE array 20 via the IO_Data bus. This bus provides for movement of 64-bit bit-lines via the IO_Data_in and IO_Data_out signal paths (see FIG. 22). Controls for input and output of bit-lines is provided by the IO_rd_en_out and IO_wr_en_out signals.

At the beginning of each subframe i/o task, the pixel I/O unit 50 sends information to the page unit to provide for sequencing of the task. The IO_cmd_out signal is asserted to signal that the IO_Data_out word contains the task information. The information included in this command word includes the page memory 40 base address, the Image size in bit-planes, and the i/o direction for the task.

Subframe i/o and paging tasks may be performed concurrently. The subframe i/o task requires periodic access to the page memory 400 within the page unit during transfers between the In/Out FIFOs and the page memory 400. The subframe i/o task has priority over the paging task for page memory 400 access during the transfer. During the transfer, the paging task is inhibited to prevent contention for the page memory 400. The mechanism for inhibiting the paging task is a discreet called Pg_Inh (page inhibit) that is generated by the pixel I/O unit 50 and provided to the Program sequencer 30.

The transfer commences immediately after the beginning of bit-line movement to/from the 6$^{th}$ page unit 200. It is therefore necessary to anticipate the beginning of the transfer by some number of clocks so that a window in the stream of paging instructions reaches the Page units at the right time. This is due to latency in the propagation of instructions through the execution pipe (within the program sequencer 30) as well as delays in the distribution networks in the PE array 20.

The pixel I/O unit 50 accounts for program sequencer 30 latency in generating the Pg_Inh signal. The i/o direction (in/out) is also taken into consideration. The interval for which the Pg_Inh signal is active provides a window for the transfer process. This window must have a duration and position (in time) that accommodates all conditions during concurrent i/o and paging.

As herein presented by way of example, a paging operation moves subframe data between the PE memory 110 and the page memory 40. Paging may be performed concurrently with foreground operations within the PE array 20, although the page operation preemptively steals an occasional instruction cycle to perform loads and stores of the CM plane. (Analogously, subframe i/o operations may be performed concurrently with paging operations, although the i/o operation occasionally preempts the page operation for a span of time to perform a transfer.)

Control for the sequencing of a page operation is provided by the program sequencer 30. In addition to the foreground instruction stream, the sequencer generates a sequence of CM shift instructions, which execute concurrently with foreground computation instructions in the PE array 20. The CM shift instructions are also provided to the page unit 200 to be used as page memory 400 read/write controls.

Figures 22, 23:
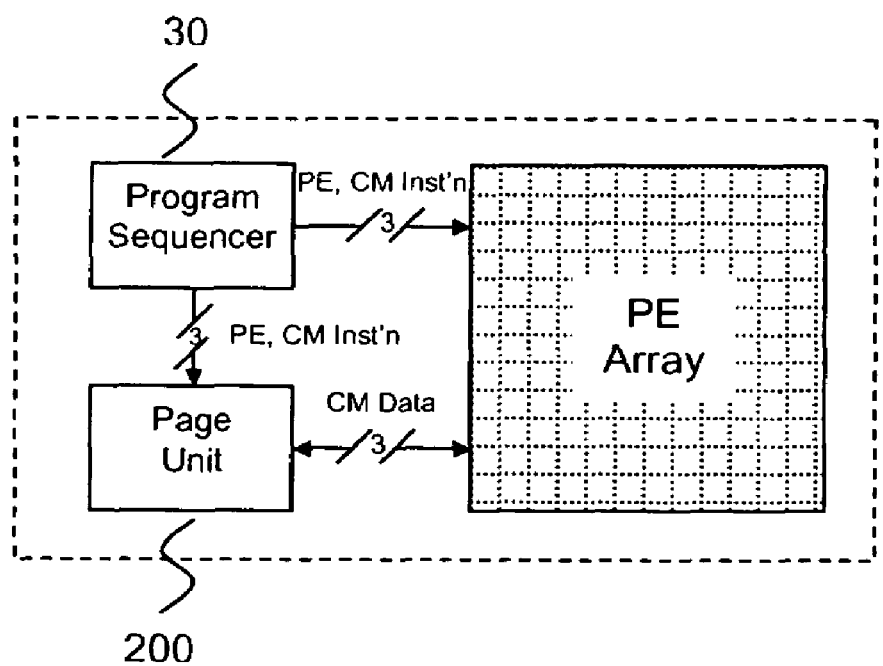
FIG. 22 is a graphical representation listing the IO_Data bus signals.
FIG. 23 is a graphical representation of the simd array processor showing major components, data paths and distribution network delays.

The CM shift instructions and page memory 400 read/write controls must be synchronized to ensure correct movement of the PE array 20 data. In the exemplary embodiment, this synchronization task is complicated by the use of distribution networks to distribute PE Instructions and CM data to and from the PE array 20. The position and delay of these networks is shown in FIG. 23.

The delay for each distribution network in the exemplary embodiment is 3 clocks. It may be seen that CM shift instructions distributed to the PE array 20 and page unit arrive at the same time. However, due to the CM Data distribution network, page unit 200 read and write controls will need to be offset by 3 clocks with respect to the CM shift commands executed by the PE array 20. In the case of a page-in task, the read controls will need to lead the CM shifts in the PE array 20 by 3 clocks. This is resolved by delaying the CM shifts by 3 clocks in the PE array 20. For a page-out, the CM shifts in the PE array 20 will need to lead the write controls by 3 clocks. This is resolved by delaying the write controls by 3 clocks in the page unit.

To begin a paging task, the program sequencer 30 initializes the page unit 200 with a page memory start address. The page unit 200 performs the initialization in response to a PE Instruction encoded to indicate a page address load. The start address is provided via the Wadr_in input (FIG. 15). From this point, the page unit 200 performs the paging task in response to CM shift commands.

The CM shift command sequence for a page-out task is shown in FIG. 15. This sequence pages out an image 2 bits in Size. Each bit-plane output starts with a load of the CM plane from PE memory 11 (CM=Aram(0), etc.). (This instruction is inserted into the instruction stream, stealing a cycle from the foreground task.) The load is followed by 7 shifts of the CM plane, providing all 8 bit-lines (per PEG) to the page unit 200 via the distribution network. (Shift instructions are concurrent and do not preempt foreground instructions.) The write of the CM data to page memory 40 occurs 3 clocks after each bit-line is provided to the distribution network.

The CM shift command sequence for a page-in task is shown in FIG. 24. This sequence pages in an image 2 bits in Size. The shifting of data into the array begins 4 clocks after reading of the page memory 40 begins. This allows 1 clock for the read of the synchronous page memory 40 followed by 3 clocks for the distribution network. Following the delay, a sequence of 8 CM shifts is performed for each bit-plane. Within the array, the 8$^{th}$ CM shift is immediately followed by a write of the CM plane to PE memory 110. The sequence of CM shifts is uninterrupted by writes to PE memory 110.

The Wram cmd sequence is shown in FIG. 24 with respect to execution by the PE array 20. As previously mentioned, the CM shift-in commands (CM=shift north) are delayed by the PE array 20 to synchronize them with the page memory 40 reads. Since the Wram cmd is not similarly delayed, the actual sequence of Wram and CM commands generated by the Program sequencer 30 differs from that shown in the table in that the Wram commands are delayed by 3 clocks to match the CM command delay performed by the PE array 20. This is an implementation detail of the exemplary embodiment.

As mentioned above, a paging task may be concurrent with a subframe i/o task. Where such concurrency occurs, the i/o task will periodically preempt the paging task in order to perform a transfer between the page memory 400 and the in FIFO 43 and out FIFO 42. The mechanism for holding execution of the paging task is the Pg_Inh (Page Inhibit) discreet generated by the pixel I/O unit 50 and provided to the Program sequencer 30 Unit.

When the sequencer receives an active Pg_Inh, all paging command generation ceases. The Pg_Inh is held active to provide a window of time for page memory 40 access by the transfer process. The pixel I/O unit 50 determines the interval for this window and generates Pg_Inh accordingly.

Although an active Pg_Inh inhibits generation of paging instructions, those instructions already generated will proceed through the execution pipe and distribution networks to be executed by the PE array 20 and page unit. The pixel I/O unit 50 takes this latency into account in generating the Pg_Inh discreet. The latency depends partially on whether the paging task is a page-in or page-out. Since the pixel I/O unit 50 does not have this information, it creates a window large enough to accommodate either paging task.

For Page-in tasks, a complication arises from the application of Pg_Inh. Since the Wram store command as generated by the sequencer is offset with respect to the CM shift commands, there is a potential for the Pg_Inh CM shifts to be executed out of order. This might occur if a Pg_Inh prevents generation of a Wram store command, but allows some of the CM shifts associated with that store. For this reason, when a page-in task is held by Pg_Inh, the 3 most recent CM shift commands are held in the execution pipe to prevent out-of-order execution.

The invention claimed is:

1. A digital data processing system comprising:
an array of processing elements having first data storage means, adapted to process bit-plane data, wherein the array of processing elements comprises M rows and N columns of processing elements;
second data storage means, coupled to the first data storage means, said second storage means adapted to store bit-plane data not needed for immediate processing, wherein the second data storage means are distributed amongst m units each providing bit-plane data storage for a M/m-row segment of the array, and wherein each unit inputs and outputs bit-plane data to and from the array in N-bit wide bit-lines; and
a data path between the first data storage means and the second data storage means, said data path being wider than one bit-line and narrower than one bit-plane.

2. The system of claim 1, further including third data storage means, coupled to said second data storage means and having higher density than the first storage means and the second data storage means.

3. The system of claim 2, wherein the third data storage means are adapted to store one of image pixel data and packed image pixel data.

4. The system of claim 1 wherein each of said m units further comprises a line buffer configured to store a single raster order pixel grouping of data in bit-line form, said raster order pixel grouping representing a pixel line comprising N pixels.

5. The system of claim 4, wherein the line buffer comprises a first FIFO storage for input of bit-line data and a second FIFO storage for output of bit-line data.

6. The system of claim 4, wherein the line buffer comprises a bi-directional FIFO storage configured for input and output of bit-line data.

7. The system of claim 4, wherein the line buffer comprises a dual port storage device configured for input and output of bit-line data.

8. The system of claim 4, adapted to conform pixel data input to a pattern whereby each of the m unit line buffers are written in turn until each unit line buffer contains a pixel line, and to simultaneously transfer pixel lines from the line buffers to the second storage means within each unit, and wherein the transfer is timed to allow uninterrupted input of pixel data to the unit, and whereby the pattern of pixel data input implies that pixels are selected in steps of m pixel lines.

9. The system of claim 4, adapted to conform pixel data output to a pattern whereby pixel lines are transferred to the line buffers from the second storage means within each unit simultaneously, and wherein each of the m unit line buffers are read in turn until all unit line buffers are empty, and wherein the transfer is timed to allow uninterrupted output of pixel data from the units, whereby pixels are written to the output frame in steps of m pixel lines.

10. The system of claim 1, wherein the array of processing elements comprises a register plane adapted to move bit-plane data between the processor array and the units, said register plane being partitioned at M/m-row intervals such that each M/m-row array segment provides an independent access point for input and output of bit-plane data via the register plane, the access point providing for transfer of bit-line data between the M/m-row array segment and the corresponding unit.

11. The system of claim 10, wherein the input and output of bit-plane data is done as a background task without interfering with computational processing by the array of processing elements.

12. The system of claim 10, further including a single program sequencer adapted to control the array of processing elements, and to provide control of computational processing simultaneously with control of bit-plane input and output.

13. The system of claim 12, wherein the program sequencer is further adapted to send commands to the units to provide read and write controls for the second data storage means for the purpose of controlling bit-plane input and output.

14. The system of claim 12, wherein the program sequencer is adapted to receive a page inhibit logical discrete and to inhibit generation of bit-plane input and output commands in response to active page inhibit discrete.

* * * * *